US009317696B2

United States Patent
Ayres et al.

(10) Patent No.: US 9,317,696 B2
(45) Date of Patent: Apr. 19, 2016

(54) DATA DETECTION AND PROTECTION POLICIES FOR E-MAIL

(75) Inventors: Lynn Ayres, Redmond, WA (US); Jack Kabat, Sammamish, WA (US); Vikram Kakumani, Bellevue, WA (US); Mashuri Libman, Woodinville, WA (US); Benjamin Stull, Seattle, WA (US); Anatoly Koretsky, San Antonio, TX (US); Andrey Shur, Redmond, WA (US); Joseph Schulman, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/545,864

(22) Filed: Jul. 10, 2012
(Under 37 CFR 1.47)

(65) Prior Publication Data
US 2014/0020045 A1 Jan. 16, 2014

(51) Int. Cl.
*G06F 21/60* (2013.01)
*H04L 12/58* (2006.01)

(52) U.S. Cl.
CPC .............. *G06F 21/60* (2013.01); *H04L 51/12* (2013.01); *H04L 51/34* (2013.01); *H04L 51/063* (2013.01)

(58) Field of Classification Search
CPC ............ G06F 17/248; G06F 17/30082; H04L 2209/60; H04L 41/0843
USPC ........................................................... 726/1
See application file for complete search history.

(56) References Cited

U.S. PATENT DOCUMENTS

| 7,484,237 | B2 | 1/2009 | Joly |
| 7,984,322 | B1 | 7/2011 | Feeser |
| 8,024,396 | B2 | 9/2011 | Sedukhin |
| 2004/0181690 | A1 | 9/2004 | Rothermel |
| 2006/0048224 | A1 | 3/2006 | Duncan |

(Continued)

FOREIGN PATENT DOCUMENTS

EP        1193925 A2     4/2002

OTHER PUBLICATIONS

PCT, International Search Report and Written Opinion, PCT/US2013/049815, Oct. 22, 2013.

(Continued)

*Primary Examiner* — Joseph P Hirl
*Assistant Examiner* — Kalish Bell
(74) *Attorney, Agent, or Firm* — Damon Rieth; Tom Wong; Micky Minhas (57) ABSTRACT

Systems and/or methods for deploying and implementing data loss prevention (DLP) policy definition that may encapsulate the requirements, control objectives and directives, and/or the definitions of sensitive data types as stipulated directly or indirectly by the regulatory policy are disclosed. In one embodiment, DLP policies may be identified by an organization to run on top of a set of electronic file systems (e.g., email systems, file systems, web servers and the like). Organizations and their administrators may implement a set of DLP policy instance which are derived from DLP policy templates. DLP policy templates may comprise both structure and meaning—and may acquire a given DLP policy by the replacement of parameterized expressions with desired parameter values. In another embodiment, the state of the DLP policy instance may change according to the lifecycle of the policy instance deployment.

3 Claims, 5 Drawing Sheets

(56) References Cited

U.S. PATENT DOCUMENTS

2008/0109448 A1   5/2008   Aboel-Nil
2009/0055427 A1   2/2009   Kulasingam
2009/0300706 A1   12/2009  Ray
2010/0115581 A1   5/2010   Goldschlag
2010/0115582 A1 * 5/2010   Sapp et al. ........................ 726/1

2012/0079275 A1   3/2012   Tsao

OTHER PUBLICATIONS

Policy-Based Email Security and Data Leak Prevention—Retrieved Date: Jan. 19, 2012 Proceedings: NA Author: NA Pages: NA http://www.messagingarchitects.com/solutions/guardian.html.

* cited by examiner

DATA DETECTION AND PROTECTION POLICIES FOR E-MAIL

BACKGROUND

Modern organizations find it desirable to find, monitor, and protect sensitive information (e.g., in electronic form)—such as PII, Financial Data, Intellectual Property, and Health data in e-mail. In order to do this, organizations attempt to model both the data that should be protected—as well as the policies that should be applied to the data. For e-mail, administrators attempt to select different scoping mechanism for their policies such as sender identity, recipient identity, and others.

In addition, administrators attempt to select and apply actions such as audit, encrypt, require TLS transmission, etc. Also, administrators try to take policies that are related to a single objective such as regulatory objective and may try to manage them as a single package, even though policies may contain different rules, and enable/disable and test policy in a single action.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

Systems and/or methods for deploying and implementing data loss prevention (DLP) policy instances from a policy object model are disclosed. In one embodiment, DLP policies may be identified by an organization to run on top of a set of electronic file systems (e.g., email systems, file systems, web servers and the like). Organizations and their administrators may implement a set of DLP policy instance by the parameterization of DLP policy templates. DLP policy templates may comprise both structure and meaning—and may be affected by the substitution of generic policy configuration with deployment specific environment configurations at time of policy creation by the replacement of parameterized expressions with desired parameter values. In another embodiment, the state of the DLP policy instance may change according to the lifecycle of the policy instance deployment.

In one embodiment, a method for instantiating a DLP policy from a set of policy templates is disclosed, the steps of the method comprising: identifying an electronic file system upon which a desired DLP policy is to be affected; identifying a set of DLP policy templates suitable for the desired DLP policy; parameterizing the DLP policy templates with desired DLP Policy-specific data; and disseminating the parameterized DLP policy instance to the electronic file system.

In another embodiment, a system for creating at least one DLP policy instance for a set of electronic file systems is disclosed, comprising: a set of DLP policy templates; each of the DLP policy templates comprising a set of component fields; a DLP policy template parameterization module, the template parameterization module capable of replacing the component fields with desired policy data; and a DLP main policy module capable of creating a DLP policy instance for a set of electronic file systems from the set of DLP policy templates.

Other features and aspects of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

As utilized herein, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

INTRODUCTION

Several embodiments of the present application disclose systems, methods and mechanisms that allow policies to be created for electronic file subsystems (for merely one example, e-mail) and model them as a set of related objects that can be installed, removed, state changed, and reported from at the same time in a single operation. While the present embodiments are more drawn to examples of e-mail systems, it should be appreciated that the systems, methods and/or techniques described here are also applicable to a wide variety of electronic file systems in a broad sense—e.g., file systems, information protection and collaboration (e.g. Microsoft Sharepoint® system), web servers, application servers and the like.

Figure 1:
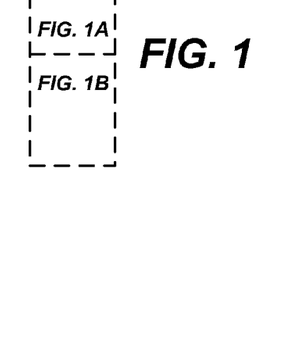
FIG. 1 depicts one embodiment of a system that affects policy systems as made in accordance with the principles of the present application.
Figure 1A:
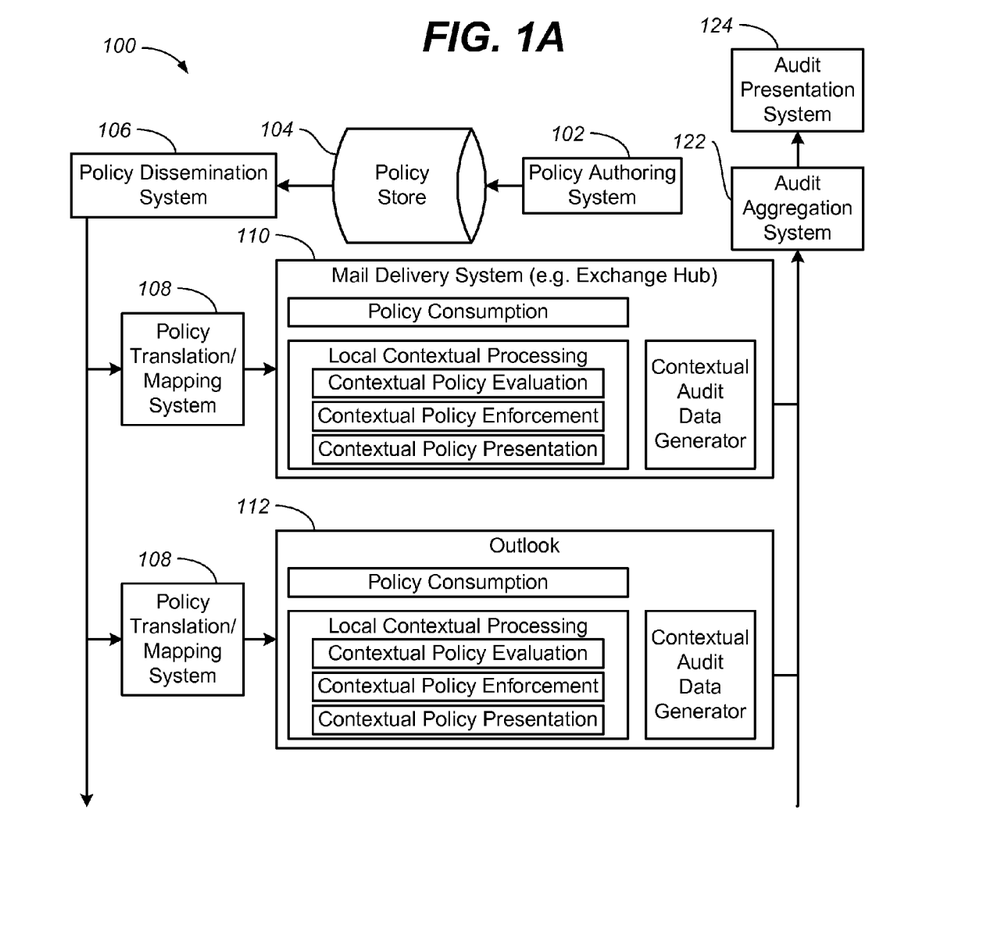
Figure 1B:
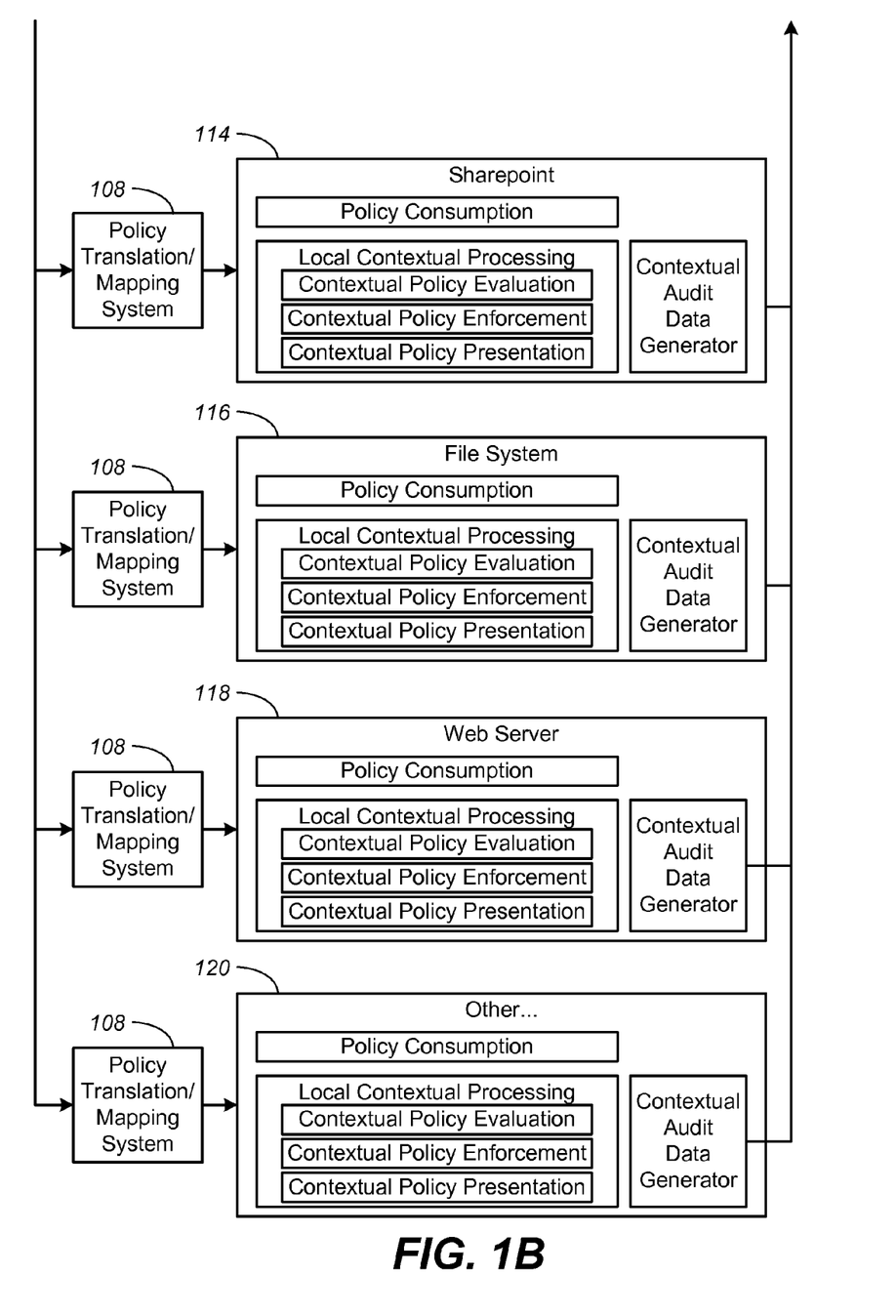

As will be discussed in more detail herein, in many embodiments, it would be desirable to employ a framework to model complex industry regulations or company information governances as a policy. Broadly, these policies—and their associated systems and methods—are generally described in area of Data Loss Prevention (DLP). Applications in this area may implement all or partial components that address the policy processing as it applies to: (1) managing the policy lifecycle; (2) enforcing and evaluating the policy at policy enforcement points; (3) generating and viewing reports and (4) managing violations for incidents One Embodiment FIG. 1 is a schematic diagram of a policy system as made in accordance with the principles of the present application. As may be seen in this embodiment, there may be several general policy modules that may work with various electronic storage and/or servers that may be set across a given organization. Broadly, there may be a Policy Management System, multiple policy enforcement points, and an Audit System for the setting and testing of a policy, respectively.

As may be seen in FIG. 1, Policy Management System 100 may comprise a policy authoring system 102, a policy store 104, a policy dissemination system 106. As will be discussed in further detail herein, these policy modules may be employed to set and disseminate a policy for the organization. Policy may be affected by various policy translation/mapping systems 108—which understand the generic policy directives and transform them to the contextually understood format by the policy enforcement points, which may interface with various electronic data subsystems—e.g., Mail Delivery Systems 110, mail client systems like Microsoft Outlook® system 112, information management systems like Microsoft Sharepoint® system 114, File Systems 116, Web Servers 118 or other suitable electronic data subsystems that are capable of policy enforcement and application.

Within these policy enforcement subsystems, there may be modules therein that implement the policies effectively within the subsystems. For example, such modules may be policy consumption, local contextual processing—which may further comprise contextual policy evaluation, contextual policy enforcement, and contextual policy presentation.

As a part of these subsystems, it may be desirable to have a contextual audit data generator. These audit data generators may be in communication with an audit aggregation system 122 and an audit presentation system 124.

It should be appreciated that many other architectures are possible for implementing a policy system that may interface with an organization's software suite—e.g., email, file servers, web interfaces and the like. In addition, it may be possible (and maybe desirable) for certain policy modules (for example, the policy authoring and store, and audit functions) to be hosted apart from the organization and supplied otherwise (e.g., server/client relationship, cloud-based services or the like).

Figure 2:
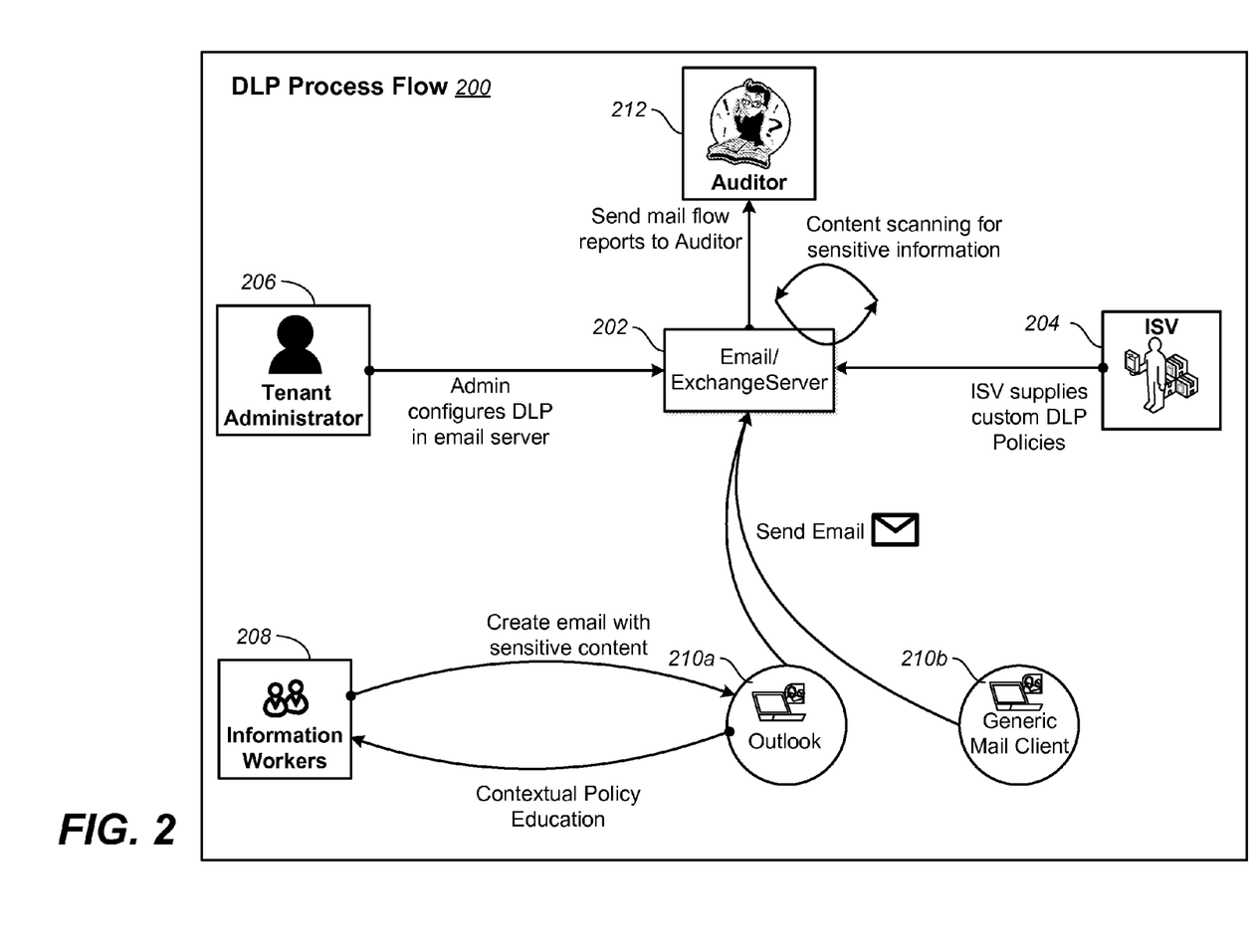
FIG. 2 depicts one embodiment of an implementation and operation of a policy system in the context of e-mail as made in accordance with the principles of the present application.

Once a policy system is implemented or otherwise configured for an organization, such policy systems take on a runtime dynamic. FIG. 2 depicts one embodiment of a runtime dynamic 200, as it might apply to an exemplary email flow policy application. The organization will typically have its email system and/or server 202 prior to the implementation of a policy system that will operated on top of, or otherwise cooperatively, with the email system.

The policy system may consume policy content from multiple sources. One such source may be as supplied with the system itself in the form of out-of-box (OOB) set of policy templates that are available as part of the product and may be acquired and installed by a tenant system administrator and/or other suitable users 206. Another source may be from Independent Software Vendors (ISVs) and product partners, and consultants that provide custom policy content for the consumption by the target organization. 204 may supply the organization with custom DLP policies. In either case, administrator 206 may perform particular configuration of a DLP policy system—in this case, working with the organization's email system. In addition to the installation/creation of the policy, it may be desirable that ongoing policy maintenance and tuning may be performed by in-house personnel or external contractors or vendors—such as the tenant administrator or by the ISVs, partners, and/or consultants. These may be represented by multiple operations such as 206 and 204.

In operation, the policy directives may include operations in contexts that the information workers interact with, such as Outlook 210a or generic email client 210b, that may result in the active education and/or notification of the policy to the organization's users. The policy directives would determine what content is considered sensitive and define the rules governing its usage/handling within the organization. Both, what is the sensitive content and rules governing its usage can be disseminated to the end users as part of the policy directives. (e.g., email with patient information, trade secret information or the like). The policy directive may allow the user of sending this information unrestricted, require explicit acknowledgement that the communication contains sensitive information and the user takes responsibility for its disclosure, or prevention of sharing outright.

Once received, email server may process the email according to the same policy definition for policy consideration, compliance and/or processing directly (or the policy system may be operating apart from the email server in a server/client relationship or the like). Once the email is scanned for sensitive content, additional actions may take place such as holding the email prior to sending outside the email server, the organization or the like. Any non-compliance with policy (or period reports of generally compliant email traffic) may be sent to an auditor 212 for follow up. Such follow-up may be to retrain affected employees—or it may detect some error in the dynamic flow and/or operation of the policy system. Any policy processing errors may be referred back to either the system administrator or to the ISV for correction. The mail processing server will enforce that the policy was uniformly applied no matter what client was used as part of the authoring experience. If the policy requires sender acknowledgements, these may be enforced for presence or the mail will be rejected back to the sender.

Figure 3:
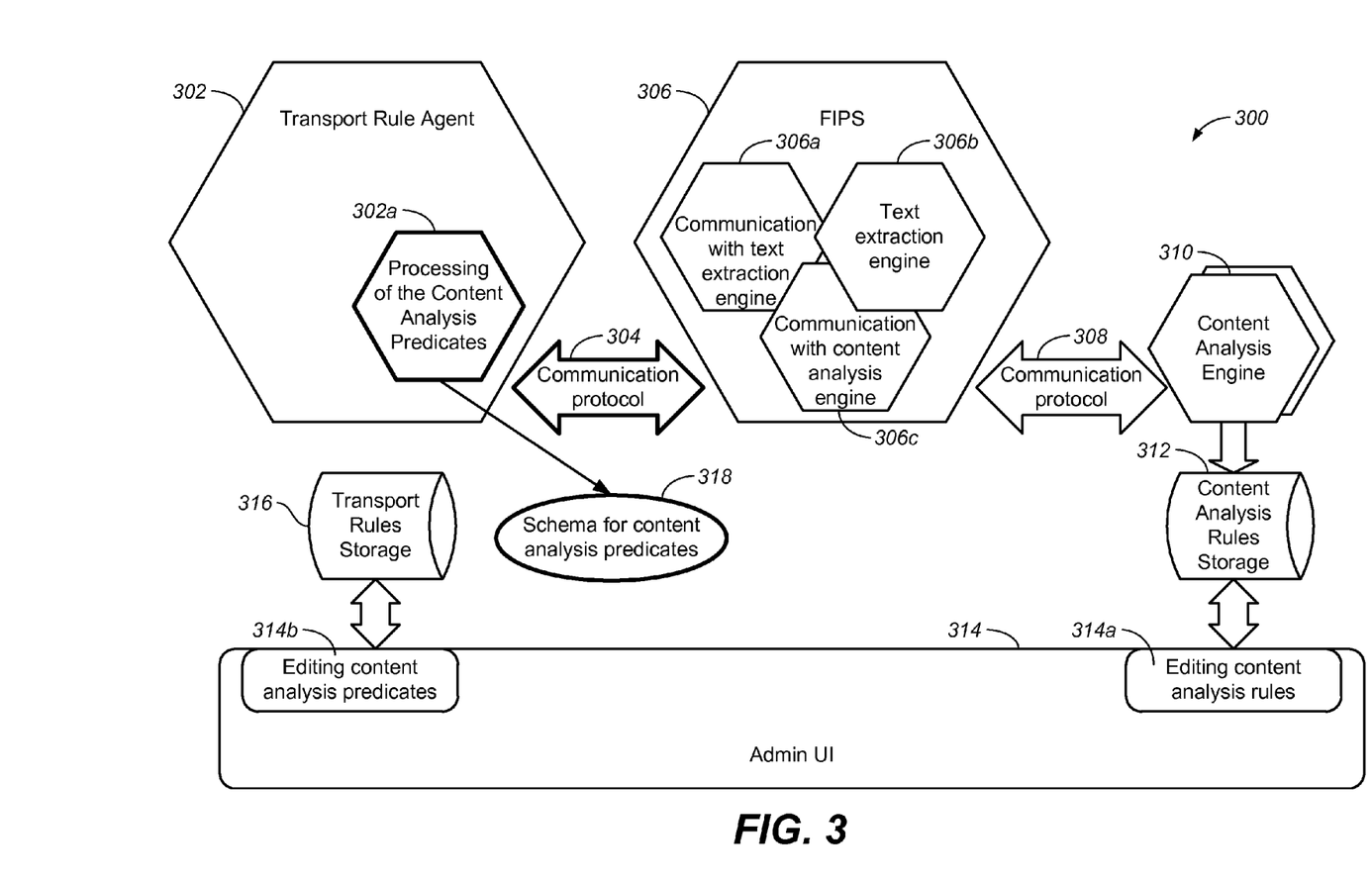
FIG. 3 depicts one embodiment of a system mail server processing subsystem as it may interface with a policy system in the context of e-mail.

FIG. 3 is the e-mail server processing details of the policy application—e.g. exchange server (box 202 in FIG. 2). FIG. 3 depicts one possible embodiment of a system mail processing subsystem 300 as it may interface with a policy system. The e-mail server's policy processing may be performed by an agent that is activated at various stages of mail processing. One such agent could be the exchange transport rules agent 302 which may employ processing of content analysis predicate 302a in conjunction with schema for content analysis predicated 318. Transport rules may be stored in 316 and administrators/user may edit content analysis predicates with module 314b via a UI 314.

The agent may interface with a message content and attachment text extraction module (referred to herein as "FIPS") 306 and content analysis module to scan for sensitive content. FIPS may be affected as a component that does the content extraction and conversion to text (e.g., both mail messages and attachments) and may pass the extracted content into the classification engine for analysis of any sensitive content as defined by the policy directives. FIPS may comprise a text extraction engine 306b and communication modules with text extraction engine and the content analysis engine, 306a and 306c respectively. FIPS may be the same as the DLP policy evaluation module—e.g., it may be constructed as a sub-component making up DLP policy evaluation—i.e., the one that does text extraction which is then fed into the classification engine for analysis for any sensitive information as defined by the DLP policy.

The text extraction module may interface (perhaps via a communication protocol 308) with the content analysis/scanning engine/module 310 which may perform the text analysis on the text identified with the e-mail bodies and any attachments. The text analysis engine may identify sensitive content based on the policy information which has been stored in the content rules store 312 such as AD. Such rules may be edited by administrators/users via module 314a via UI 314.

Data Detection and Prevention Policy Object Model Embodiment

The present systems, methods and/or mechanisms may be implemented by an object model approach. In one such embodiment, the complexities of a regulatory policy may be represented through a policy template concept which encapsulates the policy directives and controls and offers methods for its lifecycle management. It may be desirable to have the following objects defined and/or associated with an object model that may allow for ease of implementation: (1) policy template objects that allow for the installation of the policy and all associated objects; (2) a main policy object that tracks shared metadata and state; (3) a set of policy rule objects, mapping to the policy object, which define the policy directives as match conditions and actions for each policy and (4) data classification rule objects which define the structure of the sensitive data that the policy, and the regulatory specification, specify as sensitive data definitions.

For these various objects, it may be desirable to define and implement operations that act upon these objects. For example, for an exemplary policy template object operations might comprise: (1) install, (2) instantiate, and (3) remove. Operations for a main policy object might comprise: (1) creating new policy object from template; (2) creating new, editing, deleting, and managing state changes through its lifecycle. As may be the case, each of these operations may have impact on multiple objects associated with the policy which themselves implement the policy directives as appropriate in any of the applicable policy enforcement points. In the case of a policy system for email, there may be a runtime behavior for email—that may be subject to the policy—across a number of policy enforcement points which may include: (1) e-mail client (2) e-mail server (3) e-mail storage system (4) e-mail processing gateways etc. Each of the policy enforcement points interprets and applies the policy in accordance with the state of the policy as it relates to the policy deployment lifecycle which may include (1) audit only evaluation of the policy (2) audit and notification evaluation of the policy and (3) full enforcement of the policy directives.

DLP Policy Template Embodiment

Figure 4:
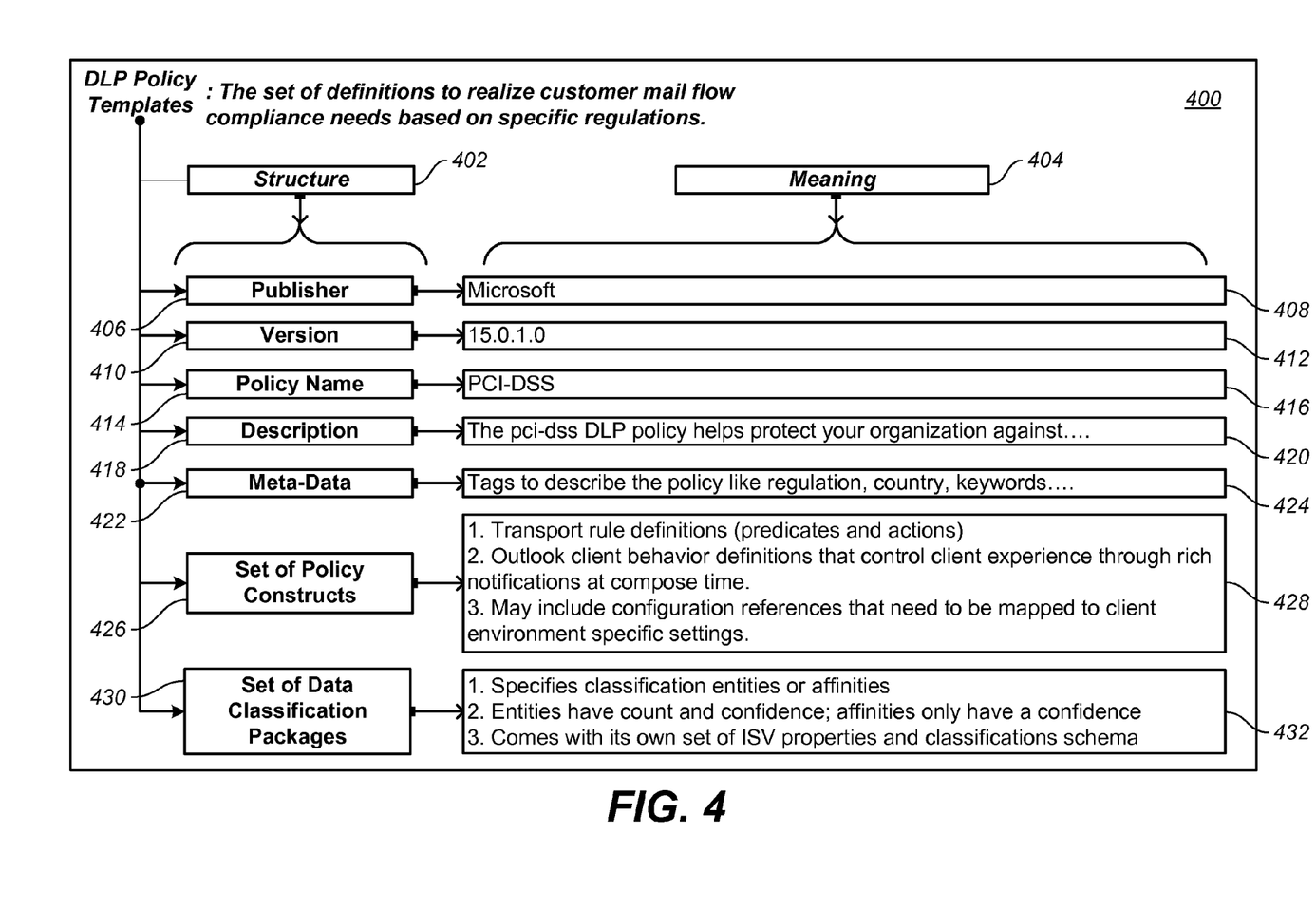
FIG. 4 is one embodiment of one exemplary DLP policy template, as it might be represented for a putative customer email system.

In one embodiment, a DLP policy template is a component description that identifies the characteristics of the policy and how it is realized using components—i.e., a configuration for components. It may be non-environment specific—e.g., a stencil used to create a deployment specific version. In addition, it may not have any state since it is just a definition. In addition, it may offer a very simple set of operations—such as: Import, Export, Deletion and Query. In one possible embodiment, the template may be authored using an XML document that may be used to express the full construct of a regulatory policy in an implementation independent format, as depicted in FIG. 4.

In this embodiment, the Import operation may allow for the import of the definition. The Import operation may be provided for "out of the box" (OOB) policy definitions that are built into the system. In addition, Import may be used to provide updates version of the policy templates for an OOB policy templates. Further, the import may be used to incorporate into the system additional policy definitions that are provided to meet custom regulatory objectives or organizational needs. These additional policy definitions may extend built-in policy definitions or create brand-new policy definitions.

The Export operation may allow for the saving, backup and offline updates of the policy definitions. Export may provide access to the serialized version of the template and may be used to migrate the template from one environment to another.

Deletion operation removes the policy definition from a deployment environment. In one embodiment, it may not be desired that Deletion is supported for OOB definitions. Query operation may allow for the discovery of the definitions for both OOB policies and any additional policies that have been added into the system.

An Exemplary DLP Policy Template Parameterization

For merely one example, FIG. 4 depicts one putative set of DLP Policy Template components 400 that might be implemented to realize exemplary customer email flow compliance, possibly based on specific regulations. As may be seen, the DLP Policy comprises a set of components (having an associated structure 402 and meaning 404)—e.g., Publisher (406, 408), Version (410, 412), Policy Name (414, 416), Description (418, 420), Meta-Data (422, 424), Set of Policy Constructs (426, 428) and a set of Data Classification Packages (430, 432). It will be noted that a set of meanings may be associated with these components. In this example, the interface for managing the DLP policy templates objects may be PowerShell or any suitable web interface.

In one embodiment, it may be desirable that the template definition allow defining properties that may be mapped to deployment values at time the template is used to create a DLP policy instance. For example, two main properties may be defined that utilize this capability: (1) exception Distribution List (DL) which may be mapped to a default DL provisioned within a DLP deployment and (2) a DLP reporting mailbox that will be used as the destination for notifications of any policy violation detections.

DLP Policy Template Parameterization

In one embodiment, a simple property replacement mechanism may be used to accomplish parameterization of fields in a template. The following may be desired for the replacement mechanism: (1) the ability to specify parameterized expression for DLP policy construct elements in a DLP template; (2) the ability to pass parameter values as part of DLP template instantiation; (3) the ability to use parameterized expressions in both OOB DLP policy templates and ISV created ones; (4) the support for Unicode strings in the DLP policy template definition and as substitution character input; (4) the ability for API to discover which properties are parameterized in a template; (5) the ability to strong type the parameterized properties in a template.

This mechanism may be implemented by a simple find and replace of name value pairs in a template. The template's DLP policy constructs would allow the specification of substation keys for which replacement values may be provided. For example, the substation keys may be of the form: %%keyName%%, where keyName is an identifier. The interface may allow the passing of a name value pair that will provide a mapping for each keyName to a value.

For merely one example, the following excerpt may be given from a policy definition in the PCI-DSS DLP policy template, as shown in FIG. 4:

```
<?xml version="1.0" encoding="utf-8" standalone="yes" ?>
<dlpPolicyTemplates>
    <dlpPolicyTemplate version="15.0.3.0" state="Enabled" mode="Audit">
        <contentVersion>1</contentVersion>
        <publisherName>Microsoft (Beta)</publisherName>
        <name>
            <localizedString lang="en-us">PII</localizedString>
            <localizedString lang="fr-fr">PII</localizedString>
        </name>
        <description>
            <localizedString lang="en-us">Detects the presence of information considered to be PII in the U.S. This includes the presence of data like SSN and Driver's License in email. After completing your testing, configure the rules in this program such that the transmission of information complies with your organization's policies. Examples include configuring TLS with known business partners, or adding more restrictive transport rule actions such as rights protection.</localizedString>
            <localizedString lang="fr-fr">Détecte la présence de l'information considérée comme PII aux États-Unis. Cela comprend la présence de données SSN et permis de conduire dans le courriel. Après avoir complété votre test, configurez les règles dans ce programme tel que la transmission de l'information conforme aux politiques de votre organisation. Configuration de TLS avec les partenaires commerciaux connus, ou ajouter des actions de règle de transport plus restrictives telles que la protection des droits des exemples.</localizedString>
        </description>
        <keywords>
            <keyword>KeyWord1</keyword>
            <keyword>KeyWord2</keyword>
        </keywords>
        <ruleParameters>
            <ruleParameter type="string" required="True" token="%%ReportSeverity-1%%">
                <description>
                    <localizedString lang="en-us">Parameter Description - reportseveritylevel#1</localizedString>
                    <localizedString lang="pl">parametr opis - reportseveritylevel#1</localizedString>
                </description>
            </ruleParameter>
            <ruleParameter type="string" required="False" token="%%ReportSeverity-2%%">
                <description>
                    <localizedString lang="en-us">Parameter Description - reportseveritylevel #2</localizedString>
                    <localizedString lang="pl">parametr opis - reportseveritylevel#2</localizedString>
                </description>
            </ruleParameter>
        </ruleParameters>
        <policyCommands>
            <commandBlock>
                <![CDATA[New-TransportRule -name "PII-outside" -comment "Monitors for PII content sent to outside the organization" -DlpPolicy "%%DlpPolicyName%%" -SentToScope NotInOrganization -MessageContainsDataClassifications @{Name="US Social Security Number (SSN)"},@{Name="Passport Number (U.S / U.K)"} -ReportSeverityLevel %%ReportSeverity-1%%]]>
            </commandBlock>
            <commandBlock>
                <![CDATA[New-TransportRule -name "PII-within" -comment "Monitors for PII content sent inside the organization" -DlpPolicy "%%DlpPolicyName%%" -SentToScope InOrganization -MessageContainsDataClassifications @{Name="US Individual Taxpayer Identification Number (US ITIN)"},@{Name="US Social Security Number (SSN)"},@{Name="Passport Number (U.S / U.K)"} -ReportSeverityLevel%%ReportSeverity-2%%]]>
            </commandBlock>
        </policyCommands>
    </dlpPolicyTemplate>
</dlpPolicyTemplates>
```

The example above may be affected by the substation of two keywords: "%%ReportSeverity-1%%" and "%%ReportSeverity-2%l%" (as given above) as part of the DLP policy creation from this template using the following sample syntax:

```
[PS] C:\>new-DLPPolicy -Template PII -State Audit -Parameters @{ "ReportSeverity-1"= "High"; "ReportSeverity-2"="Low" }
```

This would result in the creation of the resulting policy directives, possibly implemented through Exchange Transport Rules (ETR), with the parameterized keys substituted with the specified values from the "Parameters" argument. It should be appreciated that this mechanism would be available for both DLP OOB templates—as well as custom templates from ISVs and others. If any parameterized properties do not have corresponding value passed in through the Parameter option, it may be desirable that an error is generated.

DLP Policy Template Properties

The following table gives some examples of DLP Policy Template object and their associated properties. It will be appreciated that other template components may be similarly set out.

| NAME | BASE TYPE | RESTRICTIONS | DESCRIPTIONS |
|---|---|---|---|
| Identity | String | Guid | ID of the object. Unique and immutable. Can be specified at create time. |
| Name | String | <64 Unicode chars | A user friendly name to describe the object. Recommended to be unique but not enforced by the system. "Name" is an alternative mechanism used to identify the object and expected to be used by admins in PowerShell interface. Changeable by user. |
| PublisherName | String | <64 Unicode chars | Who published this DLP template. |

-continued

| NAME | BASE TYPE | RESTRICTIONS | DESCRIPTIONS |
| --- | --- | --- | --- |
| Description | String | Unicode chars | Description of the policy template. |
| Regulation | String collection | <64 Unicode chars per item | List of regulations targeted by this DLP profile template. |
| Region | String collection | 2 chars per item | List of countries targeted by this DLP profile template. The values are based on the two-letter country codes as assigned part of the ISO 3166-1 Part 1 specification which is commonly used in Microsoft Windows ® software to specify region designation of localization components. |
| Keywords | String collection | <64 Unicode chars per item | Additional keywords applicable to the policy used for searches during discovery. |

DLP Policy Template Operations

The following table gives some examples of DLP Policy Template operations and their associated descriptions. It will be appreciated that other template operations may be similarly set out.

| VERBS | DESCRIPTION |
| --- | --- |
| Get | Standard query task. Returns all DLP policy templates in the deployment environment. Support --- Filter parameter to specify server side filtering options. Filtering may be based on the following properties: PublisherName, Regulation, Region, Keywords, etc. |
| Import | Imports a policy template from a serialized version into a deployment environment. |
| Export | Inverse of Import. Exports a serialized version of the DLP policy template. |
| Remove | Removes a DLP policy template definition. |

DLP Policy Instance

DLP policy instance is the result of creating a DLP policy object from a template in a deployment environment. It represents the set of instantiated component objects employed to implement the policy definition in the template (e.g. ETRs, data classification rules etc.). An instance is deployment-specific—i.e., it tends to contain definitions that reference components and elements that are specific to a customer environment and hence it tends to be non-portable across deployments.

Unlike a template, a DLP policy instance has state which represents the lifecycle state within the customer's deployment (for example, audit or enabled). The DLP policy state may be used to control the state of the components that comprise the policy. Changes in the DLP policy instance state apply corresponding changes within the policy objects controlled by the DLP policy. Three basic states exist for a policy which represents a customer's progression in realizing their policy implementation. The following table gives one embodiment of a state table of a DLP policy instance:

| STATE | DESCRIPTION |
| --- | --- |
| Audit | Customer is collecting data on what kind of content is being sent through his mail flows without modifying any behavior. This may be used to adjust/tune policies or to determine impact and/or actions that would result from enabling the policy. |
| Notify | Client is moving to start to educate the users on the DLP policies in place and get them familiar with the business processes around sensitive content. It may desired to selectively enable enforcement actions, or alternatively, not to enable enforcement actions at all. |
| Enforcement | All aspects of the policy are enabled. |

In one embodiment, it may be desirable that there are no restrictions in terms of the movements between the states. A customer may choose to skip any of the policy or move from any one state to another. In addition to controlling the policy deployment states, the policy may also be disabled—which results in the policy being ignored in the policy enforcement points.

While the DLP policy is used to control the state of the sub-components, it is possible for the sub-components representing the individual policy directives (e.g., ETRs) to have a different state than the DLP-policy. This may allow the user to change the individual policy directive of the policy to be in a different state—for example, when adding a new directive to the policy or when troubleshooting a directive of the policy. Each policy directive may also maintain a corresponding representation of its state which maps to the values of the DLP policy state. These states may also be controlled independently at the directive level. For example, the audit state for a directive may be turned-off; by setting the directive in a disabled state. Similarly, Notify state may be turned off for a specific directive.

DLP Policy Properties

In one embodiment, the DLP policy may follow common set of properties exposed across other components that comprise the application area—e.g., Microsoft Exchange® system—and may include the following properties:

| NAME | BASE TYPE | RESTRICTIONS | DESCRIPTIONS |
|---|---|---|---|
| Identity | String | Guid | ID of the object. Unique and immutable. Can be specified at create time. |
| Name | String | <64 Unicode chars | A user friendly name to describe the object. Recommended to be unique but may not be enforced by the system. Name may be an alternative mechanism used to identify the object and expected to be used by admins in PowerShell interface. May be changeable by the user. |
| Description | String | Unicode chars | Description of the policy template. |
| State | Enum | | Indicates the desired state of the DLP policy and its sub-components. While the DLP policy is used to control the state of the sub-components, it is possible for the sub-components to have a different state than the DLP policy. |

DLP Policy Object Operations

In one embodiment, the main DLP policy object may follow common set of operations exposed across other components that comprise the application area—e.g., Microsoft Exchange® system—and may include the following operations:

| VERBS | DESCRIPTION |
|---|---|
| New | Creates a new DLP policy from a template definition. The template may be an OOB template; or the contents of a template obtained from an ISV or other third party. If no template definition or content is specified, an empty DLP policy may be created with no policy elements. |
| Get | May be a standard query task. Returns all or a subset of DLP policies in a tenant's space. DLP policy instances may be scoped to within a tenant scope since they represent the tenant's implementation of the policy components. |
| Set | The Set operation may be used to modify parameters of the policy. May be used in the change of a DLP policy's state which may also change the state of other policy components that support state semantics. |
| Remove | The Remove operation may delete the DLP policy and its associated components from the system. The user may be requested to confirm if policy and data classification objects should be removed from the system. |
| Import-DLPPolicyCollection | The Import-DLPPolicyCollection may allow the serialization of the policy components for backup/transport and maintenance. The Import-DLPPolicyCollection may re-create the policy components from a previously serialized version. |
| Export-DLPPolicyCollection | The Export-DLPPolicyCollection may allow the serialization of the policy components for backup/transport and maintenance. |

In one embodiment, a single DLP policy instance may have 0 to N policy directives that implement its behavior. This may be delivered through, e.g., Microsoft Exchange® transport rules. A transport rule may be part of 0 or 1 DLP policy instances. A single policy directive may allow the definition across any number of policy enforcement points, for example for both server side mail flow processing directives and the e-mail client processing directives.

In addition, a single DLP policy instance may have 0 to N data classification objects bound to it. The data classification specification defines what is considered sensitive content within the scope of the policy and how this content should be identified with the e-mail content. The interface for managing the DLP policy instance objects may be PowerShell, web interface or others. The DLP Policy may comprise the same or similar Verbs as disclosed for the DLP Policy Operations, as given above.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

The invention claimed is:

1. A method for implementing a data loss prevention (DLP) policy from a DLP policy template, the DLP policy implemented for at least first and second electronic file systems, each of the first and second electronic file systems comprising a file server and an associated application, and each of the first and second electronic file systems configured to communicate with a set of clients, the method comprising:

identifying a set of DLP policy template objects, from the DLP policy template, that define characteristics of the DLP policy and include associated property fields, wherein the DLP policy template is generic to the first and second electronic file systems, and wherein the set of DLP policy template objects comprises a main DLP policy object configured to track shared metadata and state;

implementing a set of local contextual processing modules, wherein implementing the set of local contextual processing modules comprises aggregating audit data from each of the first and second electronic file systems;

said set of local contextual processing modules further comprising one of a group, said group comprising:

contextual policy evaluation, contextual policy enforcement, contextual policy presentation and contextual audit data generation;

implementing the main DLP policy object based on the set of DLP policy template objects; and for each particular electronic file system of the first and second electronic file systems, identifying a set of policy rule objects specific to the particular electronic file system by parameterizing the property fields based on characteristics of the particular electronic file system, each policy rule object in the set of policy rule objects defining match condition and actions derivable from the main DLP policy object; and implementing a set of data classification rule objects, said data classification rule objects defining a set of electronic data in the particular electronic file system upon which the set of policy rule objects are applied.

2. The method of claim 1 wherein identifying a set of policy template objects for the first and second electronic file systems further comprises:

identifying a set of policy template operations, said policy template operations acting upon said policy template objects, said policy template operations and said policy template objects operable in common in the first and second electronic file systems.

3. The method of claim 2 wherein identifying a set of policy template operations further comprises:

identifying a set of policy template operations, said policy template operations comprising one of a group, said group consisting of: install, remove import, export, query and delete.

* * * * *